UNITED STATES PATENT OFFICE.

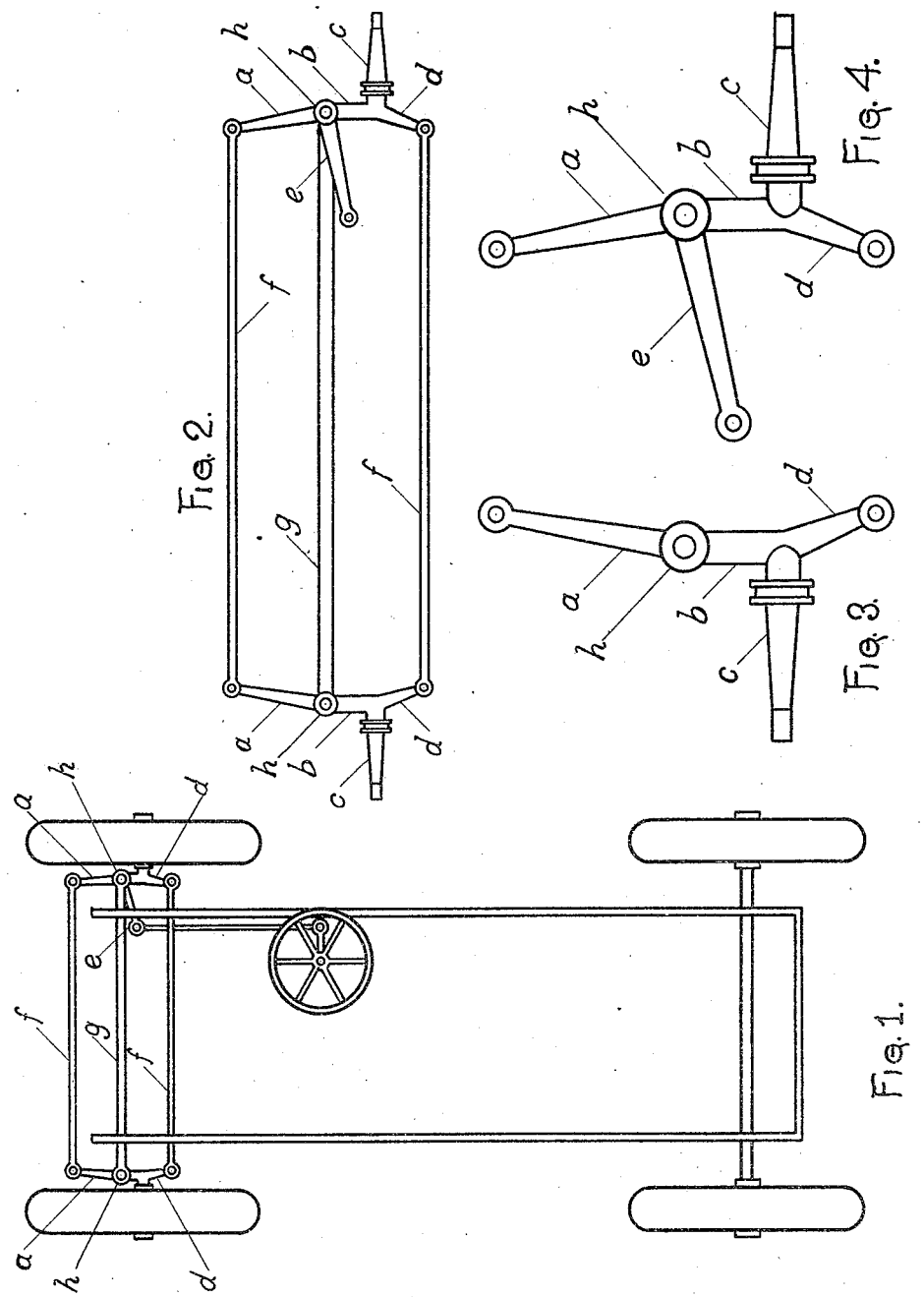

RICHARD WOLFE, OF DENVER, COLORADO.

WHEELED VEHICLE.

944,645.   Specification of Letters Patent.   Patented Dec. 28, 1909.

Application filed December 21, 1908. Serial No. 468,618.

*To all whom it may concern:*

Be it known that I, RICHARD WOLFE, a citizen of the United States, residing in the city and county of Denver and State of Colorado, have invented a new and useful Improvement in Wheeled Vehicles, of which the following is a specification.

My invention relates to improvements in wheeled vehicles such as automobiles and other wheeled conveyances in which a steering mechanism is used to direct and guide such vehicle by an adjustment or change in position of the carrying wheels of the vehicle; and the object of my improvement is to provide a safe and efficient method for constructing and steering said vehicles so that the carrying wheels which are used in steering the vehicle will automatically remain or adjust themselves in line with the other carrying wheels and thus prevent said vehicle from diverging from its course when the steering mechanism is not under the control of the driver. I attain these objects by having the spindles on which the carrying wheels turn placed upon the rear arms of the steering knuckles two inches more or less back and to the rear of that point of the axle to which the steering knuckles are attached.

The mechanism is illustrated in the accompanying drawings in which—

Figure 1 is a top view of a part of the wheeled vehicle illustrating my invention, Fig. 2 a top view of the forward parts of the wheeled vehicle showing axle, spindles, reach rods and steering knuckles with their several arms, Fig. 3 is a view of the left spindle and steering knuckle with its several arms, Fig. 4 is a view of right spindle and steering knuckle with its several arms and steering arm.

Similar letters refer to similar parts throughout the several views.

The steering knuckle $h$ with its arms $a$ $b$ $d$ and $e$ with spindles $c$ as shown in Fig. 4 consist of one piece.

In Fig. 2 the reach rods $f$ $f$ and the steering knuckle arms $a$ $a$ and $d$ $d$ are so jointed together that the carrying wheels on spindles $c$ $c$ will automatically bring the spindles $c$ $c$ in line with the axle $g$ when the vehicle is driven forward. Any kind of power may be used to propel the vehicle. The steering knuckles $h$ $h$ are jointed to the ends of the axle $g$ so that the steering knuckle arms $b$ $b$ to which the spindles $c$ $c$ are attached will turn easily and when the steering knuckle arms $b$ $b$ are turned from a right angle with the axle $g$ and the vehicle is propelled forward the arms $b$ $b$ will return to the right angle position.

The forward arms of the steering knuckles $a$ $a$ in Fig. 2 are connected by the forward reach rod $f$ and the steering knuckle arms $d$ $d$ are connected by the rear reach rod $f$ forming movable joints at the points of attachment. The axle $g$ has a steering knuckle at each end so attached as to allow of easy movement of the knuckles.

To the rear arms of the steering knuckles are attached the spindles $c$ $c$. The steering knuckles $h$ $h$ are jointed to the axle $g$ and the reach rods $f$ $f$ are jointed to the knuckle arms $a$ $a$ and $d$ $d$ and the steering arm $e$ is connected with the steering mechanism of the vehicle and when the mechanism is operated the spindles $c$ $c$ turn changing the position of the carrying wheels to right or left as desired for directing the course of the vehicle.

The two rods $f$ $f$ connecting the steering knuckle arms as shown in Fig. 1 are used for greater safety but both are not absolutely necessary and where lighter construction is desired one of them may be dispensed with.

The main feature of my invention is the arrangement whereby the carrying wheels of the vehicle are placed on spindles $c$ $c$ which are attached to the rear arms of the steering knuckles at a point back or to the rear of the point where the arms $b$ $b$ are jointed to the axle $g$ so that the carrying wheels will automatically draw into line with the direction in which the vehicle is moving which will cause the vehicle to move directly forward and prevent it diverging from its course.

I am aware that prior to my invention wheeled vehicles have been steered or directed by changing the position of the carrying wheels. I therefore do not claim such a combination broadly; but What I do claim as my invention and desire to secure by Letters Patent is—

In a steering mechanism, an axle, laterally swinging levers centrally pivoted to and having arms of equal length extending in front and rear of the axle, wheel supporting spindles extending centrally at right angles from the rear arms of the axle, a link connecting the front arms of the levers, a second link connecting the rear arms thereof, an upright shaft having a crank arm, an operating device therefor, a crank arm connected with one of the levers in line with its pivot point, and a link connecting said crank arms.

RICHARD WOLFE.

Witnesses:
JULIUS J. KLIMA,
JAMES D. HOLDEN.